United States Patent [19]

Pullen

[11] 4,364,632
[45] Dec. 21, 1982

[54] VERTICAL MICROSCOPE SLIDE

[76] Inventor: Joel F. Pullen, Rte. 1, 83B Lupine La., Templeton, Calif. 93465

[21] Appl. No.: 224,047

[22] Filed: Jan. 12, 1981

[51] Int. Cl.³ .............................................. G02B 21/34
[52] U.S. Cl. ........,.............................................. 350/536
[58] Field of Search .................... 350/95, 94, 93, 92; 356/246, 244

[56] References Cited

U.S. PATENT DOCUMENTS

| | | | |
|---|---|---|---|
| 3,432,275 | 3/1969 | Unger | 356/246 |
| 3,777,283 | 12/1973 | Elkins | 350/95 |
| 3,779,648 | 12/1973 | Poster | 356/246 |
| 4,299,441 | 11/1981 | Parker | 350/95 |

*Primary Examiner*—Jon W. Henry
*Attorney, Agent, or Firm*—Thorpe, North & Western

[57] ABSTRACT

A rectangular microscope slide with a specimen envelope for vertical use having a base of a first uniform thickness and a platform of a second and greater uniform thickness, said platform being in the lower portion of said slide and housing a specimen cavity which is open at the top. The platform surface in the area of the cavity mouth has an upwardly and outwardly protruding lip which helps direct the specimen into the cavity. The slide is transparent and disposable in nature having optical properties similar to those of glass slides.

4 Claims, 4 Drawing Figures

VERTICAL MICROSCOPE SLIDE

BACKGROUND OF THE INVENTION

This invention relates to a disposable slide for the observation of specimens in liquid media in a vertically mounted position.

For purposes of studying and diagnosing various protozoa, budding yeasts and other biological specimens, a system which could provide a greater volume of specimen in liquid media and thereby give better quantitative as well as qualitative results would be desirable. Lying-drop wet mount slides generally reduce the thickness of the media containing the specimen by the use of slip covers, thus eliminating its effective use in bacteriological studies. Bacteriological organisms not only need an environment conducive to life in order to remain alive long enough to carry out studies, but also require that a greater volume be studied to improve quantitative results and to observe movement of the organisms. Hanging drop wet mount slides provides one method of solving this problem. However, such slides are difficult to prepare and require considerable manual dexterity in inverting the slide without dislodging the liquid sample.

U.S. Pat. No. 3,777,283 teaches a slide which provides a means of quantitatively analyzing particulate matter in a liquid. It differs from the usual wet mount lying-drop slide in that it is of uniform thickness and also of uniform volume, making it much better suited to the study of bacteriological specimen. However, its design requires that it be used in a conventional laboratory microscope. This slide may be difficult to use in situations or places where a conventional laboratory microscope is not available.

U.S. Pat. No. 3,556,633 teaches a similar type of slide, having a plurality of cavities each of which is designed to accomodate a specified volume of liquid. This slide also is a lying-drop slide and can be used only in a microscope which accepts such slides in a horizontal position. In order to use this slide, a slip cover is also required.

In order to accomodate the increased liquid volume, an envelope pocket slide could also be used such as that taught in U.S. Pat. No. 3,031,924. This slide may be used in a microscope which accepts either a vertically or horizontally positioned slide. However, due to the manner in which the specimen is introduced into the circular cavity by hypodermic needle, it's fast and efficient use is restricted.

The slides in the above mentioned patents can hold the liquid volume necessary to study bacteriological specimens. However, they must either be used with a conventional slide microscope containing a horizontally mounted slide or else, as in the case with the envelope pocket slide of U.S. Pat. No. 3,556,663, used as a vertically mounted slide in a microscope which accepts such slides but has the disadvantage that its preparation is a time-consuming process. Such a slide is not suited to fit into a compact portable pocket microscope which utilizes vertically mounted slides. Such a microscope is disclosed and claimed in Ser. No. 224,054 filed of even date herewith.

OBJECT & SUMMARY OF THE INVENTION

It is an object of the present invention to provide a slide which can be used in a vertical position and will accomodate larger liquid volumes than in a wet mounted specimen.

It is also an object of the present invention to provide a slide which can be quickly prepared in a vertical position without spilling the specimen in a liquid media as is often the case with hanging-drop slides.

These and other objects may be accomplished by means of a slide which consists of a rectangular slide base on which is located a raised platform within which is molded a cavity of uniform thickness having an open top. The platform surface may have an outwardly and upwardly protruding lip adjacent the open cavity top to allow for ease of specimen insertion into the cavity. Said slide is preferably made of a molded plastic and is disposable.

DRAWINGS OF THE INVENTION

DETAILED DESCRIPTION OF THE INVENTION

Figure 1:
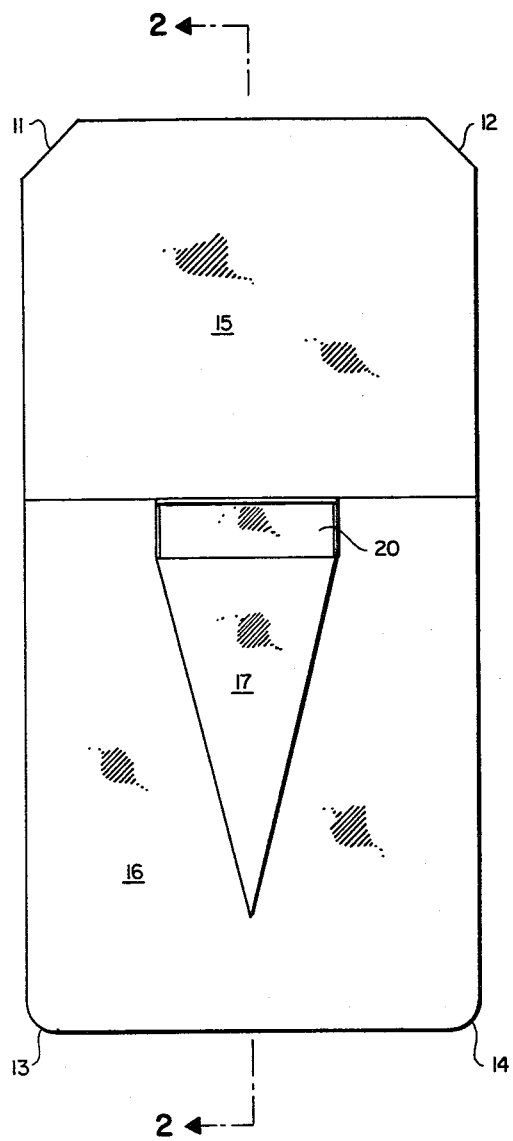
FIG. 1 is a front elevational view of one embodiment of the slide of this invention.
Figure 2:
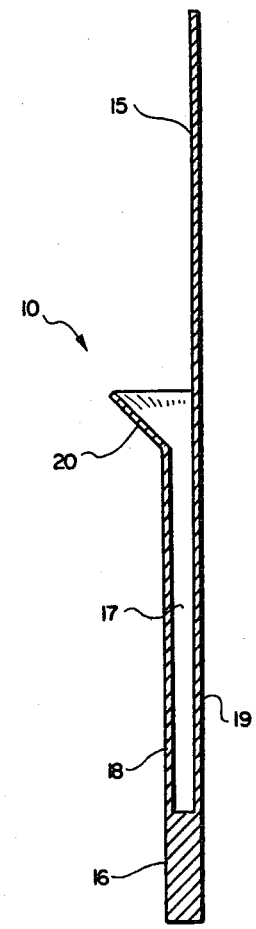
FIG. 2 is a side cross sectional view taken along lines 2—2 of FIG. 1.

The first embodiment of this invention is illustrated in FIGS. 1 and 2. The slide 10 consists of a single piece of flat rectangular material which is preferably a molded clear plastic. The top end 15 of the slide has two angled corners 11 and 12 and the bottom end of the slide has rounded corners 13 and 14. The angled top corners differentiate the top of the slide from the rounded bottom corners. The rounded bottom corners 14 and 15 provide for ease of insertion of the slide into an aperture in a horizontally held microscope. However, the top and bottom corners may be uniform and may be rounded or angled.

The upper end 15 of the slide is of a uniform thickness of about 5 to 15 mils. As illustrated, the slide abruptly widens into a raised platform 16, which has a uniform thickness of about 40 to 100 mils. Platform 16 encompasses the entire lower portion of the slide. Centered in the platform 16 is a molded cavity 17 which is open at the top but is otherwise enclosed. The front 18 and back 19 of the cavity 17 is of a uniform thickness. The back 19 is preferably the same as the thickness of the upper end 15 as shown in FIG. 2. The front 18 may be slightly thinner than the back or may be the same. The cavity 17 should have a uniform thickness of about 30 to 50 mils which gives adequate room for biological movement within the cavity when a sample is inserted therein. To facilitate the placing of a specimen within the cavity, the outer edge of cavity front 18 extends outwardly and upwardly as a protruding lip 20 as illustrated in FIG. 2. The lip 20 angles at an acute angle and has a width which is the same as the width of the opening of the cavity at the upper edge of the platform. The lip 20 has sidewalls on either side in the area where it projects outwardly from the surface plane of the platform. The cavity is illustrated as extending inwardly and downwardly toward a longitudinal center line passing through the slide in a V shape. This shape is convenient in that less liquid is required to fill the envelope 17 than with other shapes. However, shapes such as oval, rectangular or U-shaped are not to be precluded.

Figure 3:
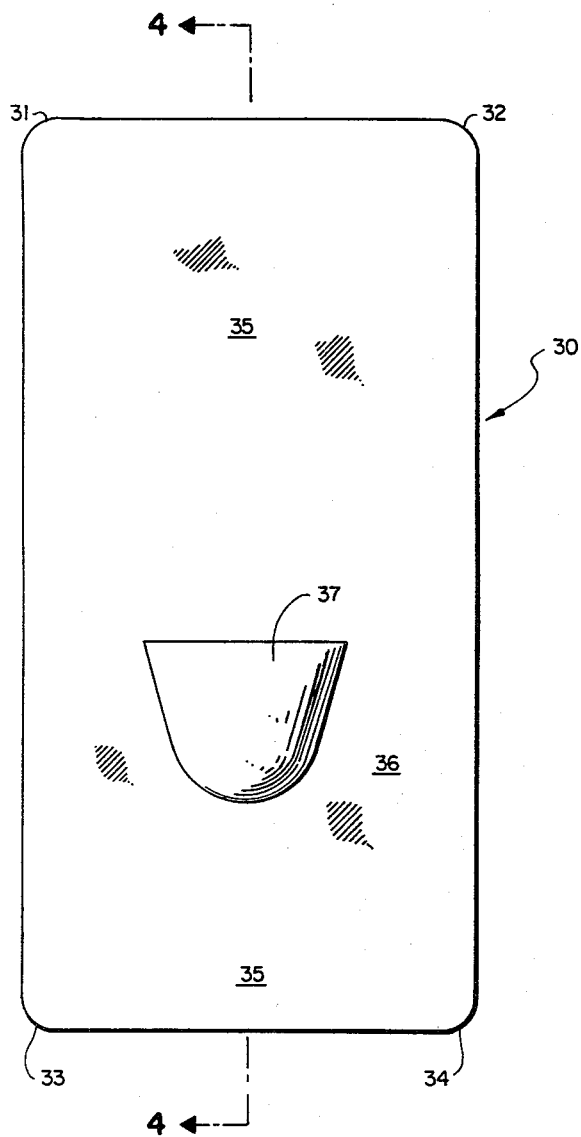
FIG. 3 is a front elevational view of a second embodiment of the slide of this invention.
Figure 4:
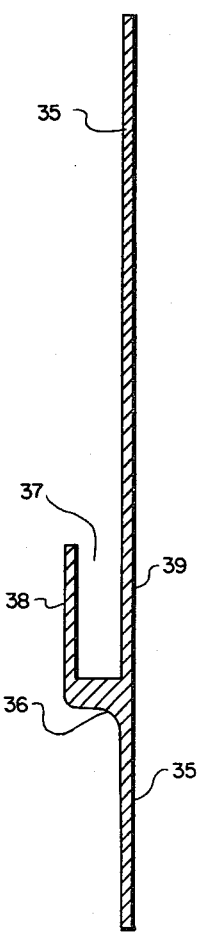
FIG. 4 is a side cross sectional view taken along lines 4—4 of FIG. 3.

A second embodiment of the invention is shown in FIGS. 3 and 4.

In this embodiment, the slide 30 has a base 35 containing four corners 31, 32, 33 and 34 which may be angled or rounded. This slide differs primarily from that shown in FIGS. 1 and 2 in that the base portion 35 extends entirely around the platform portion 36. Therefore, the base forms the general shape of the slide and the platform 36 defines the shape and size of the cavity portion of the slide. A cavity 37 is contained within the platform portion 36 having a front 38 and back 39. The back 39 is a continuation of the base portion 35. While a lip, as shown in FIGS. 1 and 2 may be desirable, this embodiment is shown without a lip to illustrate that the slide may be used with or without a lip. The cavity may be V or U shaped or of any other desirable configuration.

The slide is prepared for use by holding a swab or spatula, on which is found the specimen to be viewed, over the open cavity 17 or 37 with the slide being held in a vertical position. The specimen is washed from the swab or spatula with saline or other wash solution and falls into the cavity 17 or 37. When present, lipe 20 directs the washing liquid into the cavity. Once the cavity is filled to an adequate depth, the slide is ready for viewing. The slide is molded and designed so as to fit into the horizontally held microscope shown and claimed in Ser. No. 224,054 filed Jan. 12, 1981. The rounded lower corners of the slide are provided for ease of insertion of the slide into the microscope. The slide is held in a vertical position for insertion into an aperture located in said microscope.

The slide is made of a unitary piece of clear molded plastic such a polyethylene, polyvinylchloride or styrene which may be disposed of after use. Any clear plastic may be utilized. The slide may also be made of glass if desired. Other modifications may also be made without departing from the scope of the invention. Thus, the invention is deemed to include all equivalent embodiment to those disclosed and is to be limited in scope only by the appended claims.

I claim:

1. A rectangular microscope slide mounted from a single piece of clear material and containing a specimen envelope consisting of a base portion of uniform thickness, a platform portion located on, extending outwardly from and completely surrounded by said base portion, said platform portion having an upper transverse edge extending laterally outwardly from said base portion at essentially right angles, and a cavity of uniform thickness having a shape defined by the shape of said platform portion said cavity having an open upper end extending through the transverse laterally extending upper edge of said platform, said cavity having a front wall of uniform thickness and sidewalls formed from said platform portion and a rear wall of uniform thickness defined by said base portion.

2. A microscope slide according to claim 1 wherein said platform portion is located in a lower portion of said slide.

3. A microscope slide according to claim 2 wherein the cavity platform portion and are U shaped.

4. A microscope slide according to claim 2 wherein the cavity platform portion and are V shaped.

* * * * *

UNITED STATES PATENT AND TRADEMARK OFFICE
CERTIFICATE OF CORRECTION

PATENT NO. : 4,364,632

DATED : December 21, 1982

INVENTOR(S) : Joel F. Pullen

It is certified that error appears in the above-identified patent and that said Letters Patent is hereby corrected as shown below:

Column 4, lines 30 and 32, Claims 3 and 4, line 2, before "cavity" insert -- platform portion and --; and "is" should read -- are --.

Signed and Sealed this

Twelfth Day of April 1983

[SEAL]

Attest:

GERALD J. MOSSINGHOFF

Attesting Officer      Commissioner of Patents and Trademarks